United States Patent [19]
Pennison et al.

[11] Patent Number: 5,295,770
[45] Date of Patent: Mar. 22, 1994

[54] AIR FEED PECK DRILL WITH PNEUMATIC SAFETY SYSTEM

[75] Inventors: Robert A. Pennison, Bellville; Richard E. Eckman, Houston, both of Tex.

[73] Assignee: Indresco, Inc., Dallas, Tex.

[21] Appl. No.: 65,120

[22] Filed: May 20, 1993

Related U.S. Application Data

[63] Continuation-in-part of Ser. No. 831,821, Feb. 6, 1992.

[51] Int. Cl.$^5$ ............................................. B23B 45/04
[52] U.S. Cl. ........................................ 408/6; 408/17; 408/130; 408/702; 408/710
[58] Field of Search ................. 408/5, 6, 10, 11, 17, 408/130, 702, 710

[56] References Cited

U.S. PATENT DOCUMENTS

| | | | |
|---|---|---|---|
| 2,079,640 | 5/1937 | Vickers et al. | 77/32 |
| 2,657,595 | 11/1953 | Shaff | 77/33.5 |
| 2,869,403 | 1/1959 | Bent | 77/34.5 |
| 2,954,851 | 10/1960 | Klancnik | 188/97 |
| 3,286,555 | 11/1966 | Klancnik | 408/17 |
| 3,609,054 | 9/1971 | Nyman | 408/17 |
| 3,704,074 | 11/1972 | Deschner | 408/11 |
| 3,897,166 | 7/1975 | Adams | 408/14 |
| 4,123,188 | 10/1978 | Deremo et al. | |
| 4,702,650 | 10/1987 | Golwas et al. | 408/702 |
| 4,961,675 | 10/1990 | Stewart | |
| 5,022,798 | 6/1991 | Eckman | |
| 5,062,745 | 11/1991 | Eckman | |
| 5,073,068 | 12/1991 | Jinkins et al. | 408/17 |

Primary Examiner—Daniel W. Howell
Attorney, Agent, or Firm—Johnson & Gibbs

[57] ABSTRACT

A pneumatic air feed peck drill adapted to drill in repetitive cycles including a rapid advance phase, a slower drilling phase, and a rapid retract phase. The rapid advance phase ends and the drilling phase begins at a set back position, an adjustable distance from the workpiece, to minimize a drill bit and workpiece damage. The drill includes a drill motor and feed cylinder powered by air to rotate and advance and retract the drill motor. The drill motor and feed cylinder is coupled with an air and mechanical control system including a hydraulic feed control unit having a piston rod coupled with the drill motor to dampen the advance of the drill motor during the drilling phase and to release for rapid retract and advance phases. A brake is mounted for control of the feed control unit piston rod to releasably engage the piston rod during the retract phase to limit the movement of the rod to an adjustable set back distance controlled by a set back nut limiting the distance the brake may move relative to the feed control unit when the brake engages the piston rod. A pneumatic system including a volume chamber is coupled with the air system to control the peck cycle rate. One embodiment of the drill includes an auxiliary thrust and retract piston assembly while another embodiment has only the primary drill motor and feed cylinder. A further embodiment includes an interrupt valve in the pneumatic system to disable the drill when a safety shield is removed. The safety shield may be transparent plastic with incremental markings to aid in making adjustments.

42 Claims, 13 Drawing Sheets

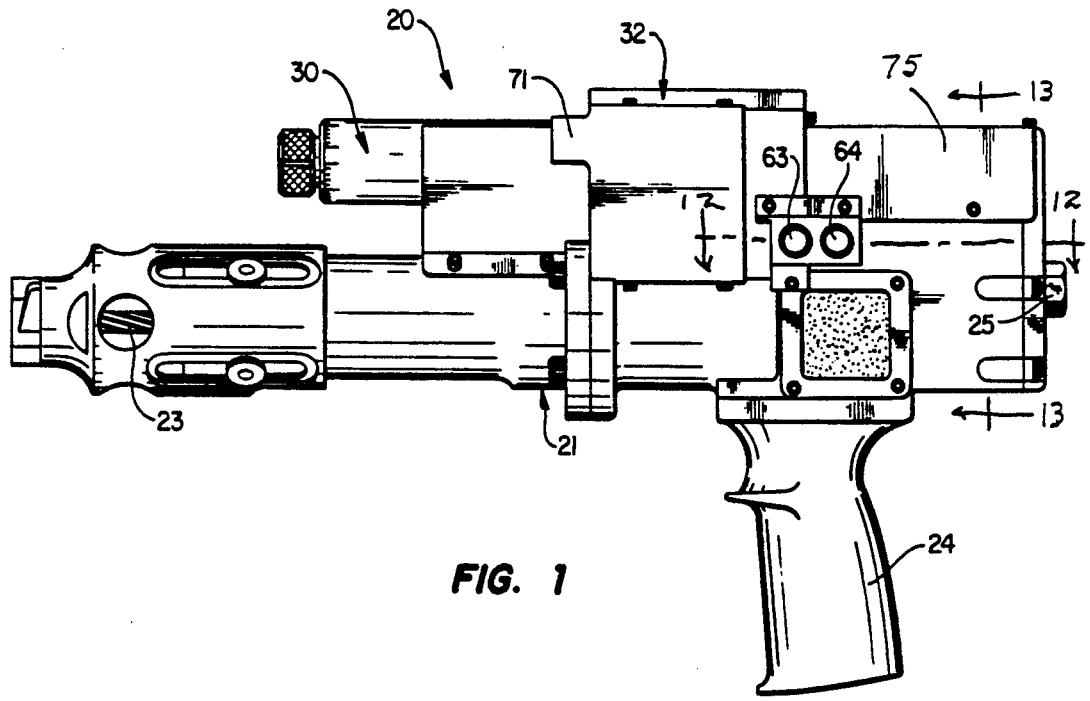
FIG. 1
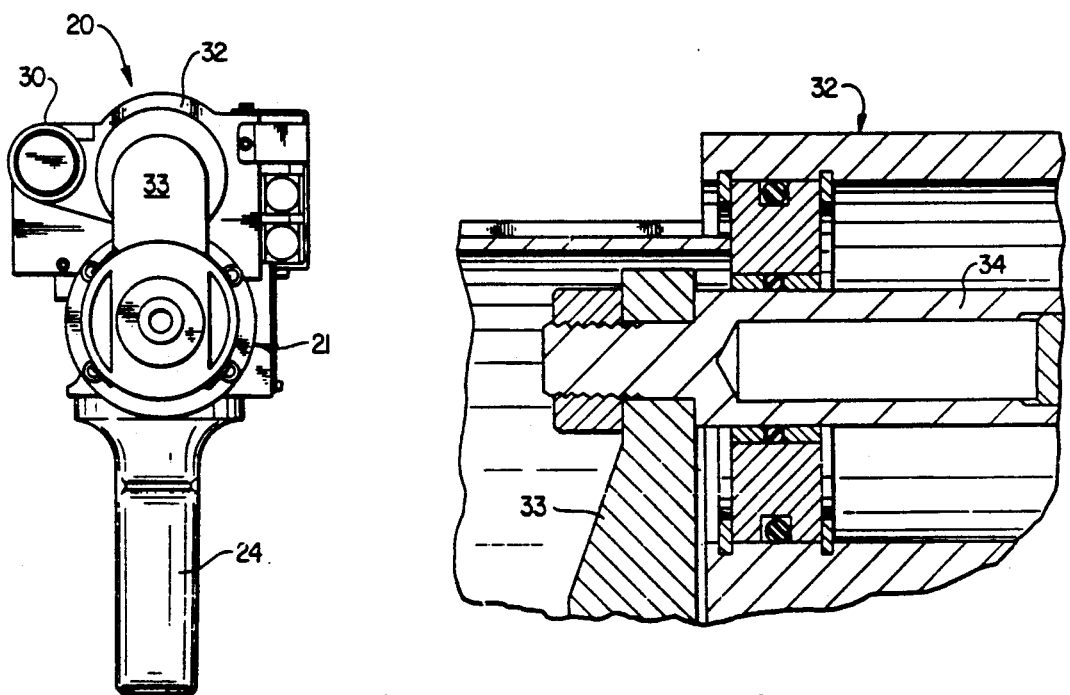
FIG. 2
FIG. 4

AIR FEED PECK DRILL WITH PNEUMATIC SAFETY SYSTEM

FIELD OF THE INVENTION

This is a continuation-in-part of Application Ser. No. 831,821 filed Feb. 6, 1992.

This invention relates to pneumatic drilling tools and particularly relates to air driven peck drills which sequentially advance and retract in controlled cycles for drilling a hole in a workpiece, the drill rapidly advancing from a fully retracted position to a set back position short of the workpiece, assuming a slower controlled drilling rate into the workpiece a controlled distance, rapidly withdrawing from the workpiece, and repeating such steps until the desired depth of hole is produced. More specifically, this invention relates to a peck drill having a safety device to render the drill inoperative when a protective shroud is removed.

PRIOR ART

The drilling of holes in workpieces which require accurately drilled holes within minimum tolerances, such in the aircraft industry, requires that the drill bit enter and reenter the workpiece as drilling progresses at a controlled rate to avoid improper drilling of holes and drill bit damage. Rapid advance of a drill bit as distinguished from a slower controlled drilling rate when the bit is first entering the workpiece or reentering the hole can cause such hole and bit damage. Operating the bit advance and retraction over the full travel of the bit during repeated cycles can, however, require excessive drilling time if the normal drilling rate is used throughout the entire bit travel.

The concept of the peck drill has developed with both mechanically controlled and pneumatically controlled drills being available in the industry. Such systems advance the drill bit at a somewhat rapid rate toward the workpiece with the rate decreasing to a desired drilling rate before the drill bit contacts the bottom of the hole at the depth which the hole been drilled during the previous drilling cycle. The distance between the drill bit position at which the bit starts the normal drilling rate and the position of the bottom of the hole is called the "set back". Maintaining a set back in peck drilling protects the workpiece and the drill point and must be adjustable. U.S. Pat. No. 4,123,188, issued Oct. 31, 1978, to Deremo el at, teaches a pneumatic peck drill control system which includes structure for controlling the feed rate of a drill bit with a pneumatic memory feature which permits rapid advance of the drill bit to a position short of the bottom hole being drilled. U.S. Pat. No. 4,961,675, issued Oct. 9, 1990, to Stewart discloses an air operated peck drill which includes a brake for controlling the position and set back of a piston rod operating in a damping cylinder. The brake includes an adjustable internal nut for varying the set back of the damping cylinder piston rod.

Peck drills of the type of the invention include rapidly reciprocating shafting and cross bars which may present a hazard to an operator in the absence of a protective shield.

SUMMARY OF THE INVENTION

An air feed peck drill is provided which includes an air operated drill mounted in a primary power cylinder for advancing and retracting the drill coupled with a pneumatic and mechanical control system which controls the rapid advance, the set back, the drilling, and the retract phases of operation and positions of the drill including the drill depth, the drill feed rate, and the drilling cycle frequency. A drilling rate control unit is coupled with a brake operable with an adjustable nut to slow the drill at a variable set back distance between the rapid advance of the drill before the drill reenters the workpiece and the actual drilling phase of each peck cycle to minimize damage to the drill bit and workpiece as a hole is drilled into the workpiece. One particularly important feature of the pneumatic and mechanical control system of the drill is an essentially repetitive drilling cycle while the rapid advance phase varies with the depth of the hole being drilled. Another important feature of the invention is a pneumatic safety system which renders the drill inoperative in response to the removal of a protective shield covering the reciprocating apparatus of the drill.

DESCRIPTION OF THE DRAWINGS

The air feed peck drill of the invention is best understood by reference to the following detailed description taken in conjunction with the accompanying drawings wherein:

FIG. 1 is a side view in elevation of a peck drill embodying the features of the present invention;

FIG. 2 is a front view in elevation of the drill of FIG. 1;

FIG. 4 is a further enlarged fragmentary side view in section showing a portion of the yoke coupling the drill with a secondary thrust piston;

DESCRIPTION OF PREFERRED EMBODIMENTS

Figure 3:
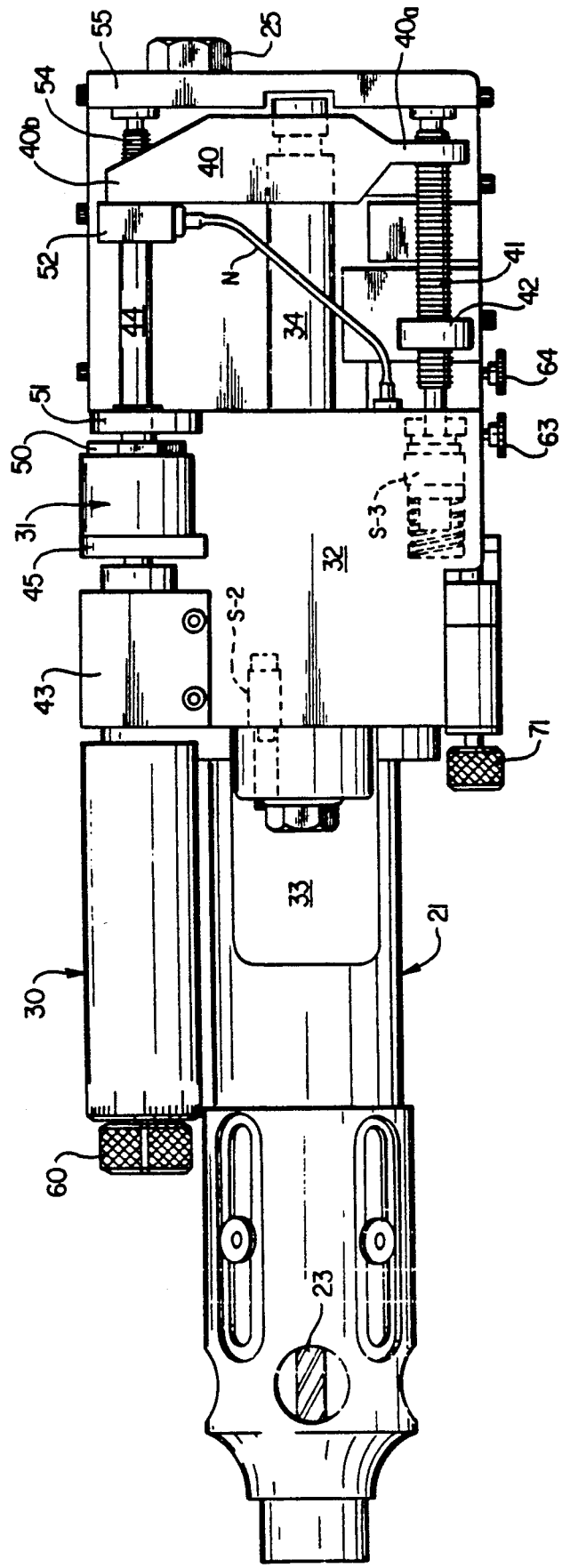
FIG. 3 is an enlarged top view of the drill of FIGS. 1 and 2 showing certain internal features in phantom lines and protective covers over portions of the control system removed.

Referring to FIGS. 1-5, an air feed peck drill 20 embodying the features of the invention includes a rotary air driven drill motor and feed cylinder assembly 21 connected with a drill chuck 22 which holds a drill bit 23 rotated and advanced and retracted by the drill motor and feed cylinder. The drill motor and feed cylinder assembly is mounted on pistol grip handle 24 to permit an operator to hold the drill when drilling holes in a workpiece, not shown. An air supply connection 25 is provided at the back end of the cylinder assembly 21 to supply operating air to the drill. Control and power components are mounted on the cylinder assembly including a hydraulic feed control unit 30, a brake 31, and a thrust piston assembly 32. The drill motor, feed control, brake, and thrust piston assembly are interconnected as described in more detail hereinafter to provide for operation of the drill through the rapid advance phase to the set back position, and the drilling and the retract phases as the peck drill cycles are repeated for drilling a hole in a workpiece. The drill motor and feed cylinder 21, as well as the feed control 30 and the brake 31, are known components in the pneumatic drill art. Details of a similar drill motor and feed cylinder assembly are shown in U.S. Pat. No. 2,657,595, issued to Shaff, Nov. 3, 1953. Drill motor and air feed cylinder assemblies also are shown schematically in U.S. Pat. Nos. 4,123,188 and 4,961,675, supra. Similarly, the hydraulic feed control or damping cylinder 30 is shown schematically in U.S. Pat. Nos. 4,123,188 and 4,961,675. The brake 31 is an available component utilizing conical members and radially moveable balls for gripping the traveling piston rod of the feed control unit 30. A similar brake design is illustrated and described in U.S. Pat. No. 4,961,675.

Figure 5:
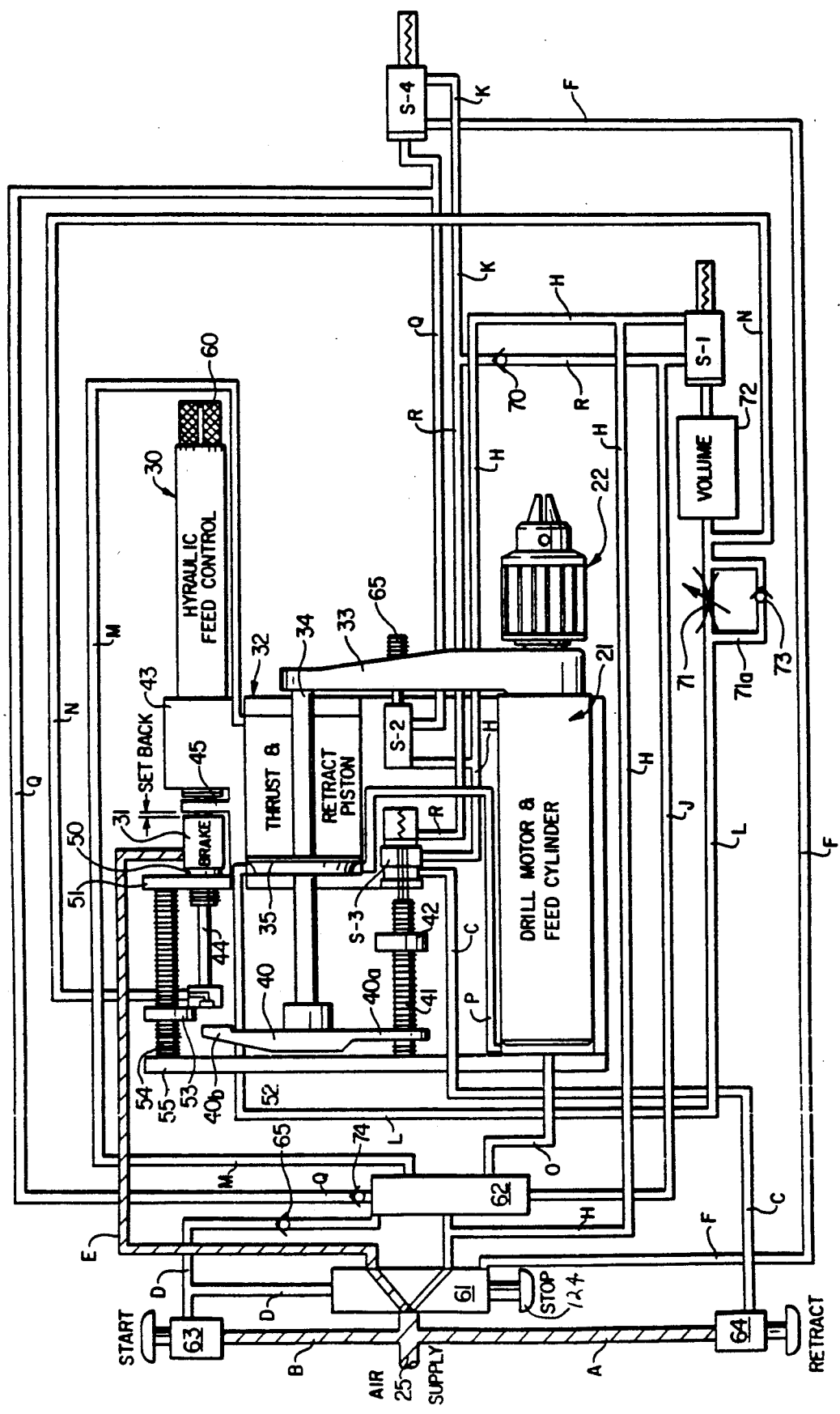
FIG. 5 is a schematic diagram of the pneumatic power and control system of the drill of FIGS. 1-4 showing the drill and control system at the beginning of a peck cycle prior to the rapid advance phase showing the hydraulic feed control brake against the set back adjustment nut.

Referring particularly to FIGS. 3-5 inclusive, the drill motor and feed cylinder 21 and the thrust and retract piston assembly operate along parallel spaced apart axes and are coupled together by a yoke 33 connected from the drill motor to a first end of a piston rod 34 extending outwardly from the thrust and retract piston assembly 32. The piston rod 34 is connected through a piston 35 of the thrust and retract piston assembly extending at a second opposite end from the opposite end of the assembly where the piston rod is connected with a thrust arm 40 which functions with control components of the drill through the rapid advance, drilling, and retract phases of the peck cycle of the drill. A first end 40a of the thrust arm moves along a movable depth control rod 41 mounted for longitudinal movement parallel to and between the axes of the thrust and retract piston assembly 32 and the drill motor and feed cylinder 21. A depth limit ring 42 is adjustable along the rod 41 to control the drilling depth.

The hydraulic feed control unit 30 is secured by means of a clamp 43 to the body of the drill aligned parallel with the axes of the thrust and retract piston 32 and the drill motor and feed cylinder 21. The hydraulic feed control unit has an outwardly biased piston rod 44 which extends from the unit through a stationary bulkhead 45, the brake 31, an adjustable set back nut 50, and a stationery bulkhead 51. The feed control unit piston rod 44 is movable through the bulkhead 45, through the brake, and through the bulkhead 51, with the movement permitted, the "set back", being determined by the position of the set back nut 50 around the piston rod 44 relative to the bulkhead 45. Since the brake is mounted on the rod between the bulkhead 45 and the set back nut 50, the distance of the nut from the bulkhead determines how far the rod and brake can move from the bulkhead 45 which is the "set back" distance. A hydraulic feed control pad 52 is mounted on the outward end of the feed control piston rod 44 and is engageable by the opposite end 40b of the thrust arm 40 at the end of the rapid advance phase and the beginning of the drilling phase. A rapid advance stop 53 is adjustably mounted on a rod 54 between the bearing stationery bulkhead and a bracket 55. The stop 53 limits the maximum extension of the hydraulic feed control piston rod 44 from the feed control unit 30. As evident in FIG. 5, the feed control pad 52 includes an exhaust flow passage which is engaged and closed by the thrust arm end 40b at the end of the rapid advance phase and the beginning of the drilling phase. The face of the pad 52 has a circular gasket, such as an O-ring, not shown, around the exhaust opening in the face so that a flat face on the thrust arm end 40b will close the exhaust opening when contacted by the thrust arm. The co-action between the thrust arm and the pad 52 performs a timing function in the operation of the drill, explained in more detail hereinafter. The drilling rate, the rate at which the drill may advance after the drilling phase begins is controlled by the hydraulic feed control unit which is adjustable by means of the knob 60 to control a bypass valve, not shown, within the unit determining the rate at which the fluid in the cylinder of the unit may move between the opposite ends of the unit as the piston rod traverses the unit during the drilling phase.

Referring to FIG. 5, the drill 20 is powered and controlled by air supplied to the drill through the fitting 25 in the drill body into an assembly of air lines and valves including a 4-way master valve 61 and a 4-way selector valve 62. The air supply fitting 25 is connected into an air line B leading to a button operated start valve 63 and into an air line A leading to a button operated retract valve 64. The start valve 63 is connected into branch air lines D, one leading to the master valve 64 and the other leading to the selector valve 62 through a check valve 65. An air line E is connected from the master valve 61 into the brake 31 to supply air to the brake for releasing the brake from the feed control unit rod 44. An air line F leads from the master control valve 61 to a pilot operated relay valve S-4. An air line C is connected from the retract valve 64 into a depth control valve S-3 which is both pneumatically and mechanically operated. The depth control rod 41 is engageable with the valve S-3 for mechanical operation of the valve, while air flow through the line C from the retract valve 64 to the valve S-3 also will open the valve. An air line H extends from a pilot operated valve S-1 to both the valve S-3 and a valve S-2 which is mechanically engageable by an adjustable rod 66 attached to the yoke 33 at the end of the retract phase of a peck cycle. An air line J connects from the selector valve 62 into the valve S-1 and into an air line R which extends through a check valve 70 to the valve S-3. The air line R also connects into an air line K leading to the valve S-4. An air line L extends from the power or thrust end of the thrust and retract piston assembly 32 through an adjustable frequency or peck cycle rate valve 71 into a volume chamber 72 which performs a frequency or peck cycle rate function in the operation of the drill. A bypass air line 71a passes around the valve 71 through a check valve 73. An air line M is connected from the selector valve 62 into the retract end of the thrust and retract piston assembly 32. An air line N is connected from the feed control pad 52 into the air line L between the adjustable valve 71 and the volume chamber 72 to permit the volume chamber to exhaust through the feed control pad when the thrust arm end 40b is not in contact with the feed control pad. An air line O connects from the selector valve 62 into the power or pressure end of the drill motor and feed cylinder 21. An air line P also connects into the power end of the drill motor and feed cylinder assembly 21 from the power or thrust end of the thrust and retract piston assembly 32. An air line Q is connected from the selector valve 62 through a check valve 74 into both the valve S-2 and the valve S-4.

The peck drill of the invention is operated to drill holes of a desired depth in a workpiece utilizing a sequence of peck cycles during which the drill bit is advanced, retracted, and advanced until a hole is drilled. During each cycle the bit is rapidly advanced to a position short of the workpiece, slowed to a drilling rate into the workpiece, retracted at a more rapid rate, and then rapidly advanced again to a position just short of the bottom of the hole being drilled. Each cycle the bit is driven a little deeper into the workpiece with the piston rod of the hydraulic feed control stopping at the set back position during each cycle slightly closer to the bottom of the hole so that while the hole is getting deeper the actual drilling phase the cycles are substantially the same. FIGS. 5-10 illustrate the rapid advance, drilling, and retract phases of several peck cycles of the drill to advance the drill bit into a workpiece to a desired depth.

Figure 6:
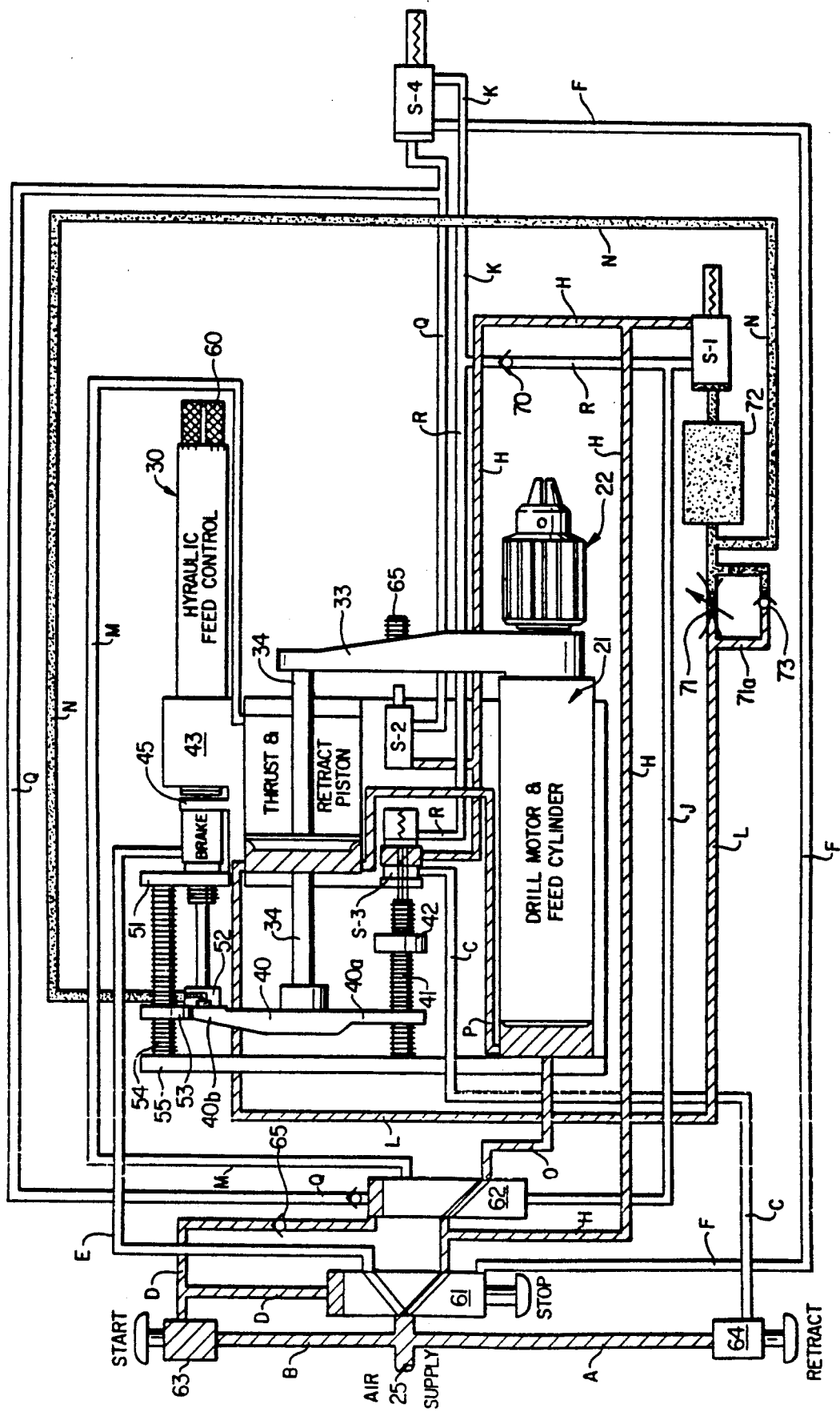
FIG. 6 is a schematic diagram similar to FIG. 5 showing the drill at the end of the rapid advance phase with the brake moved toward the hydraulic feed control cylinder away from the set back plate the length of the set back setting at which position the drill reenters the workpiece.

Referring to FIG. 5 illustrating the drill in a standby mode, the master valve 61 is open only to the air valve E applying pressure into the brake 31 releasing the brake so that the feed control piston rod 44 is free to extend to a full state of protrusion from the feed control cylinder until the feed control pad 52 engages the rapid advance stop 53. The brake 31 travels with the rod 44 until the end of the brake engages the set back nut 50. While the brake will travel with the feed control rod away from the feed control cylinder until the brake engages the set back nut, it is to be understood that with the brake in the released condition the rod will continue to travel relative to the brake once the brake movement is stopped by the set back nut. From the standby mode, the drill is started beginning the rapid advance mode by depressing the start valve 63 initiating air flow as represented in FIG. 6. Opening the start valve applies air pressure through the two branches of the line D including the check valve 65 into the master valve 61 and the selector valve 62. Both the master and selector valves are shifted as illustrated in FIG. 6 applying pressure from the master valve through the air line O into the power end of the drill motor and feed cylinder 21 which pressure is also communicated through the air line P into the power or thrust end of the thrust and retract piston assembly 32 from which the air also flows through line L to the cycle rate metering valve 71. The air flows through the metering valve at a rate dependent upon the setting of the valve into the air line N which includes one branch leading into the volume chamber 72 and another branch leading to the feed control pad on the hydraulic feed control piston rod 44. Air also flows from the master valve through the air line H to the valves S-1, S-2, and S-3, of which are closed. The valve S-2 remains closed until the drill fully retracts. The valve S-3 remains closed until the full depth of a hole is reached, or, alternatively, until the valve is opened by pressure in the air line C. The metering valve 71 reduces the pressure of the air flowing to the volume chamber and through the air line N to the feed control pad 52 so that the air pressure in the volume chamber requires a predetermined time depending upon the setting of the metering valve to build up, while the higher pressure from the master valve is transmitted into both the drill motor and feed cylinder 21 and the thrust and retract piston assembly 32. With the higher pressure being applied from the master valve into both the drill motor and feed cylinder and the thrust and retract piston assembly, the force of the air in the cylinders of both assemblies rapidly moves the drill motor and the thrust piston with the yoke 33, the thrust piston rod 34, and the thrust arm 40 in a forward rapid advance phase direction extending the drill motor with the chuck 22 toward a workpiece, not shown. The thrust arm is moved forward from the position shown in FIG. 5 to the position shown in FIG. 6. During this rapid advance phase the air in the line N is allowed to exhaust through the port in the feed control pad 52. When the thrust arm reaches the end of the rapid advance phase, the end portion 40b of the thrust arm engages the feed control pad 52 closing the exhaust port in the feed control pad, mechanically engaging the feed control pad to drive the hydraulic feed control rod 44 in a forward direction into the feed control cylinder. When the thrust arm engages the feed control pad to start driving the hydraulic feed control piston rod into the hydraulic feed control unit, the rapid advance phase ends and the drilling phase begins with the rate of drilling being controlled by the setting of the hydraulic feed control unit as established by the knob 60 on the unit. The damping effect of the feed control unit limits the rate at which the rod 44 may be forced into the unit, thus, controlling the advance of all of the moveable components of the drill including the drill motor and chuck, the yoke 33, the thrust and retract piston rod 34, and the thrust arm 40. When the drilling phase begins, the brake is at the set back position of FIG. 5, the brake traveling forward with the rod 44 through set back distance to engage the bulkhead 45 which stops the forward movement of the brake. The set back distance is set prior to drilling by means of the adjustable set back nut 50 so that the drilling phase will begin the distance of the length of the set back, prior to or from the engagement of the tip of the drill bit with the workpiece so that the drill will strike the workpiece not during the advance phase but after the slower drilling phase has begun. When the brake strikes the bulkhead 45 stopping the forward movement of the brake, the rod 44 being moved forward by the thrust arm freely moves through the brake telescoping into the hydraulic feed control unit. The brake only locks the rod 44 when the rod is moving outwardly from, not telescoping into the hydraulic feed control unit. When the thrust arm end 40b engaged the feed control pad 52 blocking the exhaust of air from the line N through the pad, the air pressure in the line N and the volume chamber 72 began increasing and continued to increase throughout the drilling phase of the peck cycle.

Figure 7:
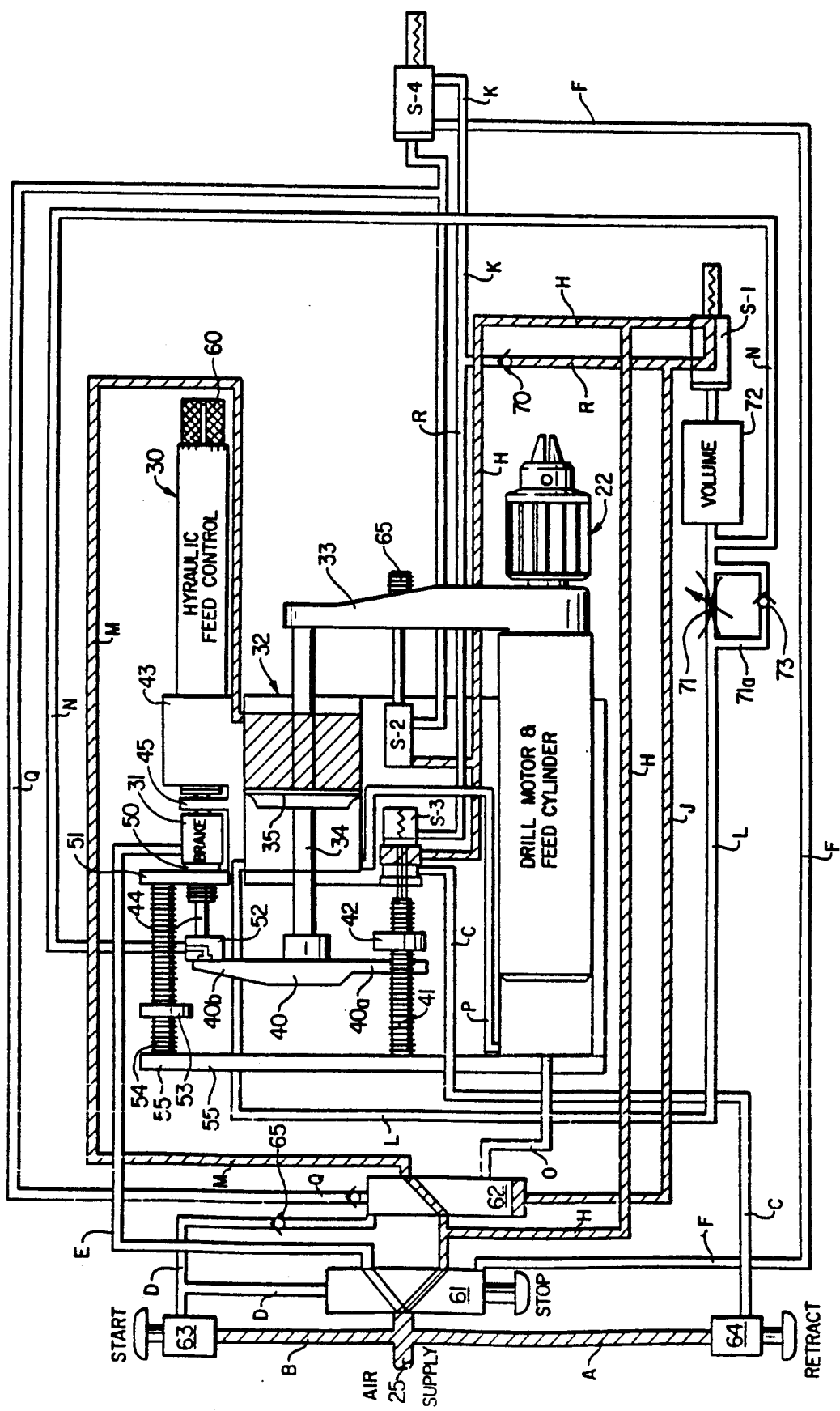
FIG. 7 is a schematic diagram similar to FIG. 6 showing the drill after the drilling phase at the beginning of the retract phase of a peck cycle when the brake reengages the hydraulic feed control rod to move back against the set back control nut.

When the air pressure in the volume chamber reaches a predetermined value, such as 25 psi, the pressure from the volume chamber through the short branch of the air line N leading into the valve S-1 communicates the volume chamber pressure into the valve S-1 opening the valve as represented in FIG. 7 communicating air pressure through the air line J back to the selector valve 62 shifting the selector valve to the position of FIG. 7 which cuts off the flow of air to the power ends of the drill motor and feed cylinder and the thrust and retract piston assembly, while simultaneously opening the selector valve into the air line M which directs air to the retract end of the thrust and retract piston assembly beginning the retract phase of the peck cycle. The thrust piston moves in the retract direction, to the left in FIG. 7, retracting the drill motor with the chuck 22 away from the workpiece back into the drill motor and feed cylinder 21. As the drill retracts, the outwardly biased hydraulic feed control rod 44 begins to move out of the feed control unit, to the left in the schematic diagrams, with the ball elements in the brake immediately engaging the feed control rod so that the brake is locked on the rod and moved away from the feed control unit and bulkhead 45 against the set back nut 50, the length of movement being the set back distance. When the brake engages the set back nut the movement of the brake and the feed control rod 44 stops while the drill motor with the chuck, the yoke, the thrust piston rod, and the thrust arm continue in the retract phase leaving the feed control unit rod 44 with the feed control pad 52 at the position which is the set back distance from the workpiece at which the retract phase began. When the end 40b of the thrust arm moves away from the feed control pad 52, the pressure in the line N and the volume chamber 72 is released to bleed back to atmospheric. No provision is made for exhaust of the air in the power ends of the thrust and retract piston assembly and the drill motor and feed cylinder during the retract phase. The air behind the drill motor and the piston of the thrust and retract piston assembly is exhausted through the drill motor keeping the motor turning to rotate the chuck and the drill during the retract phase. This keeps the motor running until the drill clears the workpiece. The hydraulic feed control unit piston 44 and the pad 52 do not retract farther during the retract phase beyond the set back distance from the bottom of the hole in the workpiece due to the action of the brake with the rod 44. Air pressure continues to be applied through the air line H and the branches of the air line into the valves S-2 and S-3 which are still closed. The continued rotation of the motor while the bit is being withdrawn from the hole is an extremely important requirement of the bit for precision drilling to prevent scoring of the hole by the retracting bit.

Figure 8:
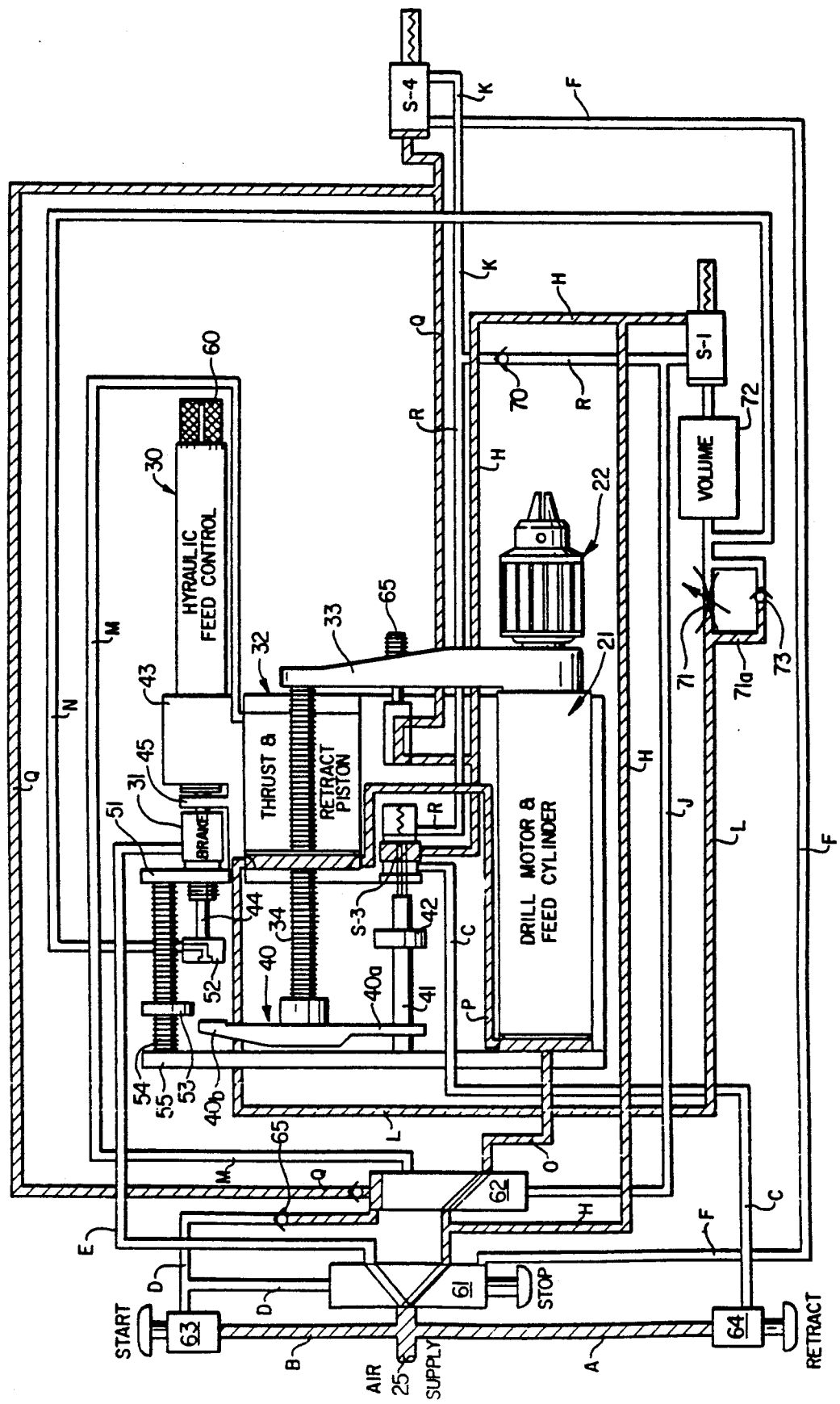
FIG. 8 is a schematic diagram similar to FIG. 7 showing the drill at the end of the retract phase of the peck cycle of FIG. 7 to begin the next rapid advance phase of the peck cycle.
Figure 9:
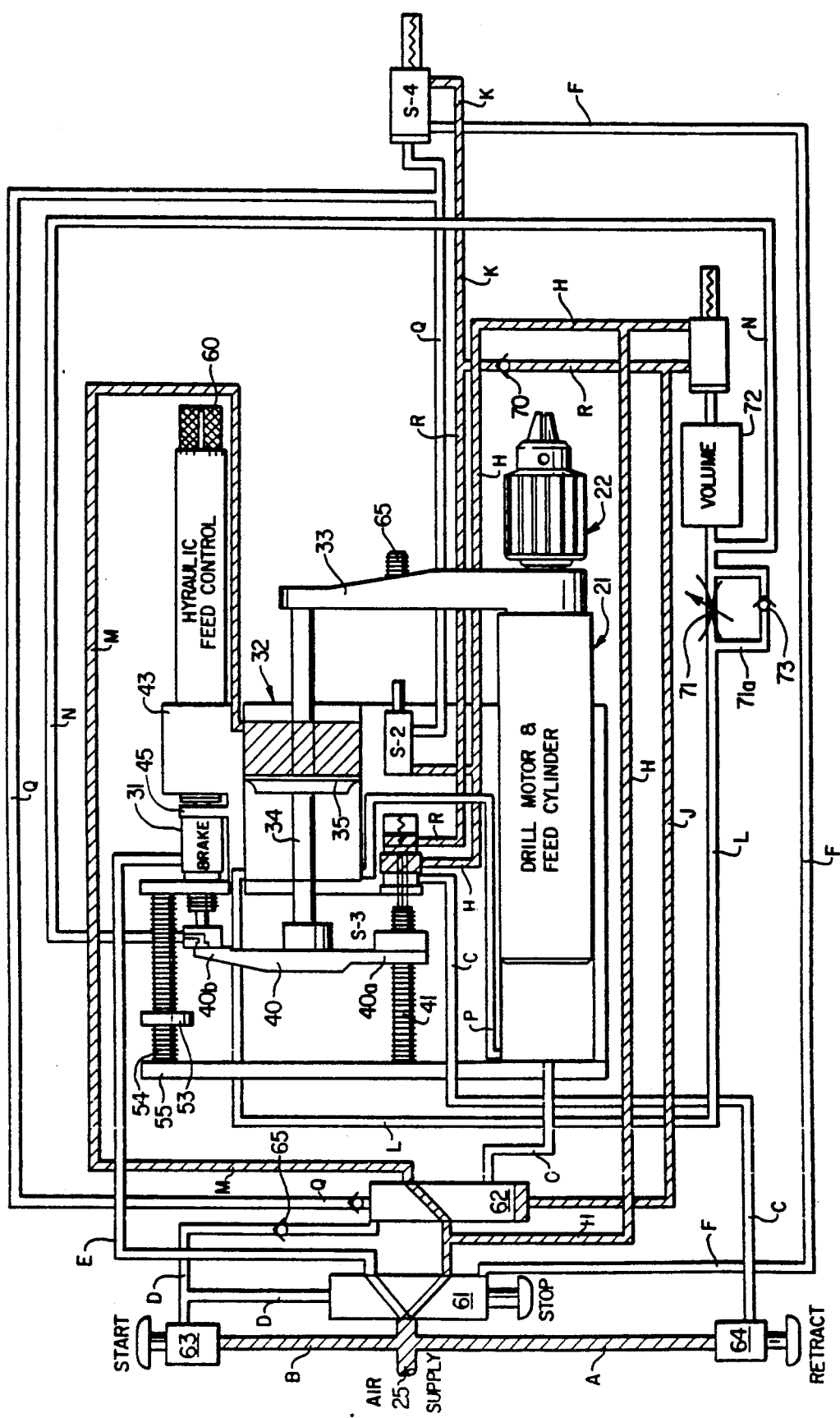
FIG. 9 is a schematic diagram similar to FIG. 8 at the end of the next drilling cycle when the drill has reached the desired hole depth.
Figure 10:
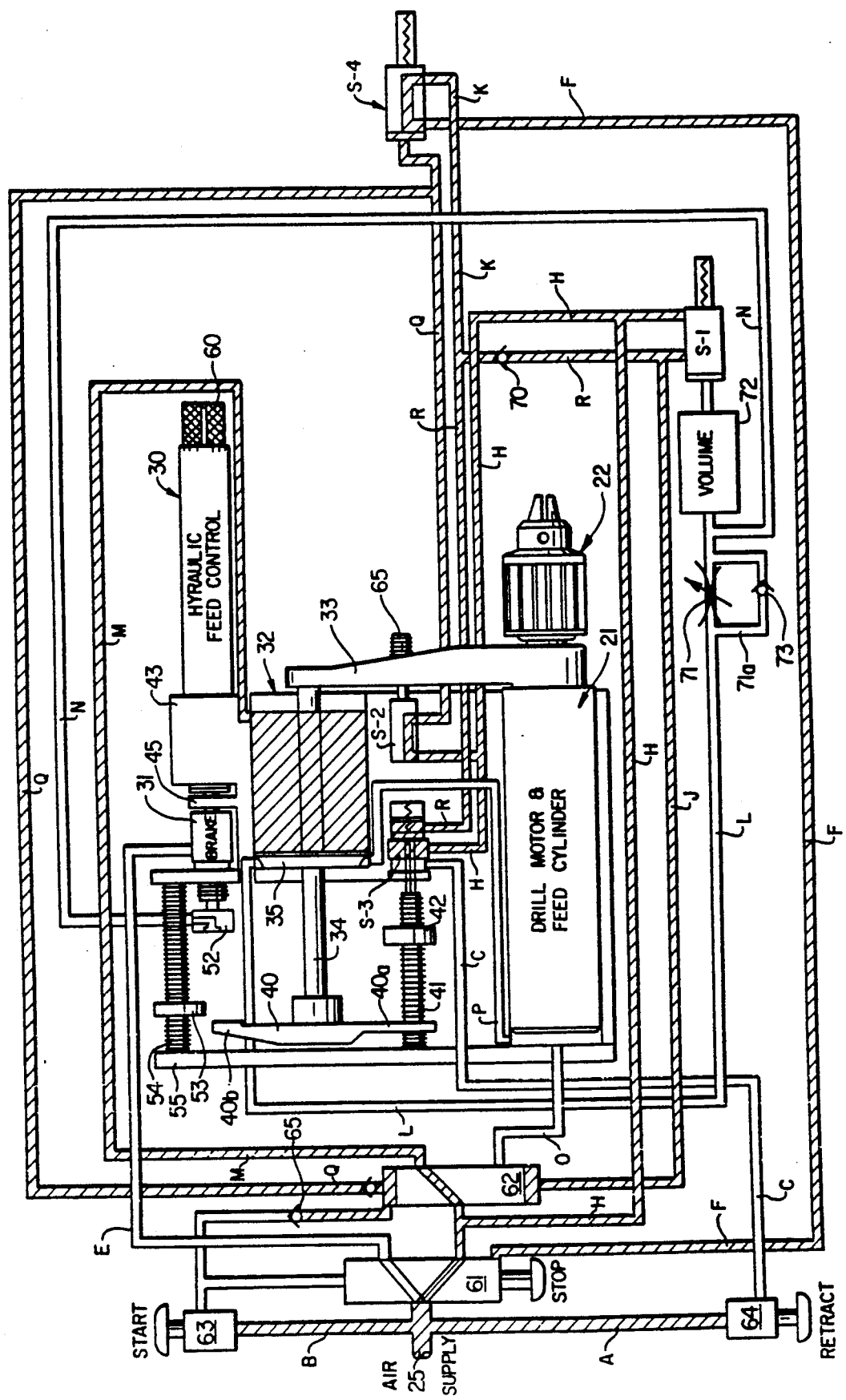
FIG. 10 is a schematic diagram similar to FIG. 9 at the end of the next retract phase of the peck cycle with the drill in the standby mode.
Figure 11:
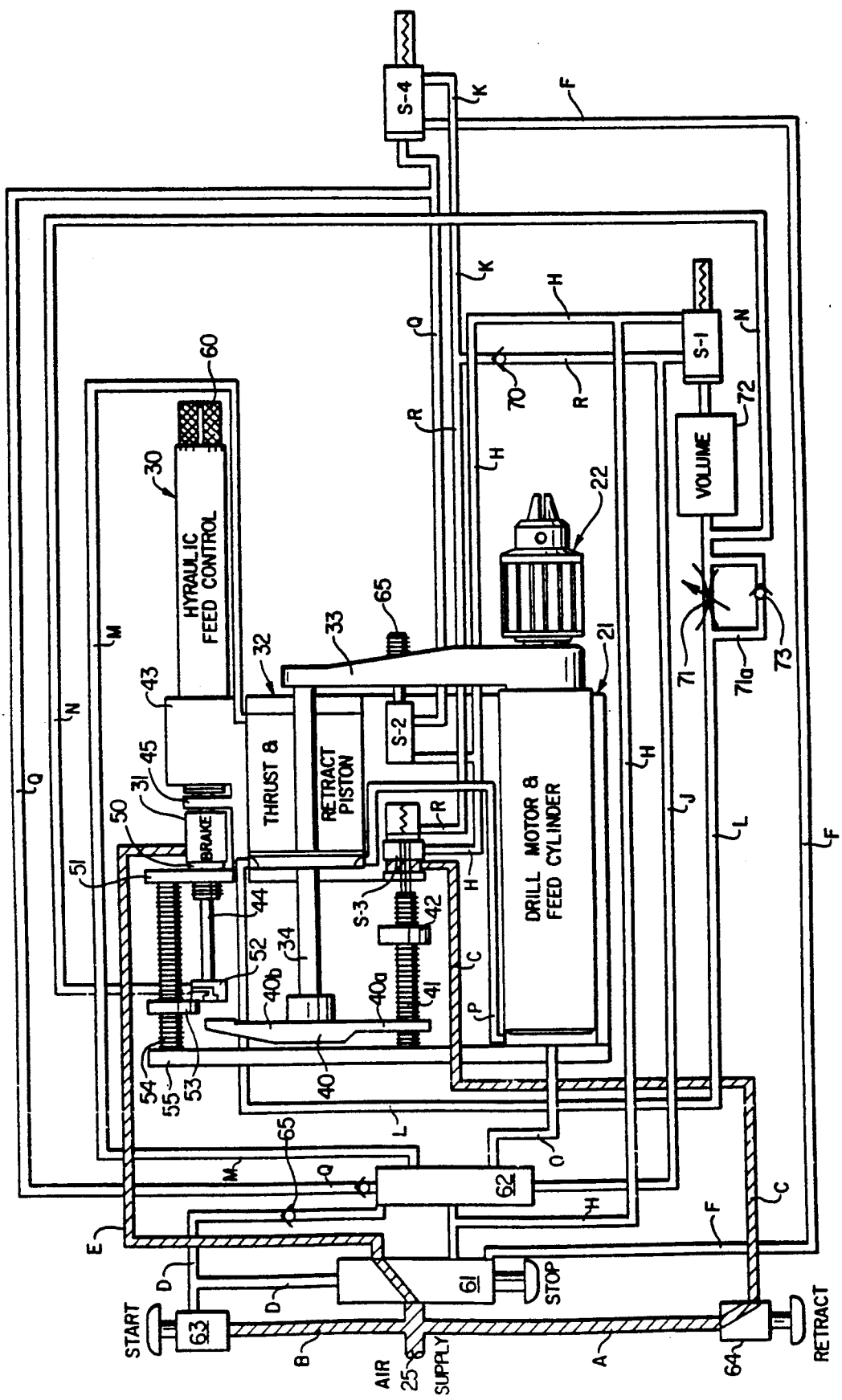
FIG. 11 is a schematic diagram similar to FIG. 10 showing the drill fully retracted with the brake released and the hydraulic feed control rod fully retracted.

The retract phase continues from the component positions of FIG. 7 to the positions illustrated in FIG. 8 when the retract valve operator 66 engages the operator rod of the valve S-2, as shown in FIG. 8, opening the valve S-2 to apply air pressure into the air line Q and to the valve S-4. The air pressure through the line Q into the selector valve 62 shifts the selector valve back to the position of FIG. 8 supplying air again to the thrust and power ends of the thrust piston and retract piston assembly and the drill motor and feed cylinder assembly to initiate another rapid advance phase of a peck cycle. When the air line Q was pressurized, the air into the valve S-4 opened the valve, though at this stage there is no air pressure to be controlled by the valve in the lines F and K. The rapid advance phase again begins and continues until the end portion 40b of the thrust arm reengages the feed control pad 52 beginning the drilling phase and the build up of pressure again in the line L, the volume chamber, and the air line N. When the thrust arm reengages the feed control pad, the brake moves with the feed control unit rod 44 the distance of the set back from the set back nut 50 to the bulkhead 45 during which time the bit is slowed from the rapid advance phase to the drilling phase prior to reengagement with the workpiece for continuing drilling into the workpiece. At the desired hole depth, the end 40a of the thrust arm 40 engages the depth limit ring 42 forcing the depth control rod 41 toward the valve S-3 as represented in FIG. 9 opening the valve S-3 admitting air pressure to the air line R and the air line K. The air pressure in line R is communicated into the air line J to the selector valve 62 shifting the selector valve back to the retract position. The valve S-3 will remain open until the air line H is exhausted. FIG. 9 shows the drill components at the end of the drilling stroke or bottom of the hole and the beginning of the retract phase. At the end of the retract phase the yoke 33 as shown in FIG. 10 opens the valve S-2 supplying pressure into the air line Q opening the valve S-4 which has pressure being supplied through the air line K so that the open valve S-4 allows air pressure into the line F which recloses the master valve 61. The air line Q will not shift the selector valve 62 because of pressure remaining in the air line J. Closing the master valve will exhaust the entire tool and pressurize the air line E as shown in FIG. 11 which will cause the brake 31 to release the hydraulic feed control rod 44 and permit it to return to the rapid advance position. The tool is then back in the standby mode of FIG. 5.

Depressing the retract button 64 while the drill is operating will pressurize the air line C pneumatically opening the valve S-3 causing the same operation as mechanically opening the valve to shift the drill into the retract phase so that the tool will go back to the standby mode as described with respect FIGS. 9 and 10. At any time, the stop valve 61 may be pressed closing the master valve shutting down the drill at whatever position the drill components are in at the time the stop button is pushed. The tool may then be restarted at that position in the peck cycle by pushing the start button. It will continue in the same particular phase of the peck cycle.

It will be seen that a new and improved air feed peck drill has been described and illustrated which advances the drill bit chuck and drill bit a certain amount each cycle until the desired hole is drilled in a workpiece. The drill components rapidly advance, slow to a desired drill rate short of the workpiece so that the workpiece and hole are not damaged by the rapid advance, move into the workpiece at the slow drilling rate and drill to the desired depth, thereafter rapidly retracting to begin the next cycle. The peck cycle rate, the drilling rate, the drilling depth, and the set back distance at which the drill slows before reentering the work are all adjustable to meet desired drilling conditions. While the rapid advance and retract modes vary with the depth of a hole being drilled, the actual drilling cycle which includes the set back distance plus the distance drilled during each peck cycle is substantially repetitive in each of the peck cycles required to drill a hole. Thus, an air feed peck drill has been described and illustrated which is smaller and lighter than available drills with an adjustable peck cycle, an adjustable set back, and a constant drill cycle, regardless of depth. The tool will rapid advance, go into a feed cycle which is controlled by hydraulic constraint, retract and reenter the hole, stopping an adjustable distance from the bottom of the hole to protect the drill point and then feed to the bottom and cut metal for an adjustable and substantially repetitive length of time.

While the drill bit 20 has been described as including the thrust piston and retract assembly, the design of the tool may be modified to make it lighter and more compact by elimination of the thrust and retract piston assembly connecting the yoke 33 directly to the thrust arm 40 and supplying the volume chamber and related air lines, such as to the feed control pad 52, from the air line L with the air line L connected into the air line O. For retraction the air line M is connected into the drill chuck end of the drill motor and feed cylinder 21 to supply air pressure for retracting the drill motor and chuck. Otherwise, the power and control components are as illustrated and described.

Referring to FIGS. 12–15, a peck drill 20A includes the safety features of another embodiment of the peck drill in accordance with the present invention. Referring to FIG. 3, the thrust piston rod 34, the thrust arm 40, the depth control rod 41, and the hydraulic feed control rod 44 when rapidly reciprocating can be a hazard to an operator of the peck drill. Accordingly, to protect the operator, a sheet metal shroud 75 is mounted on the drill covering the thrust arm and rods. The shroud must be removed to make adjustments in some of the controls, such as the depth limit ring 42. Constantly changing drilling requirements often tempt operators to leave the shroud off the drill resulting on occasion in serious operator injuries. To obviate the need for and to discourage the removal of the protective shroud, the shroud 75 is replaced with a clear polycarbonate shroud described hereinafter and the drill is equipped with the safety system of the invention to disable the drill in the event the shroud is accidentally or intentionally removed. In FIGS. 12–15, those drill parts which are common to the drill 20 of FIGS. 1–4 will be identified by the same reference numerals used in FIGS. 1–11.

Figure 12:
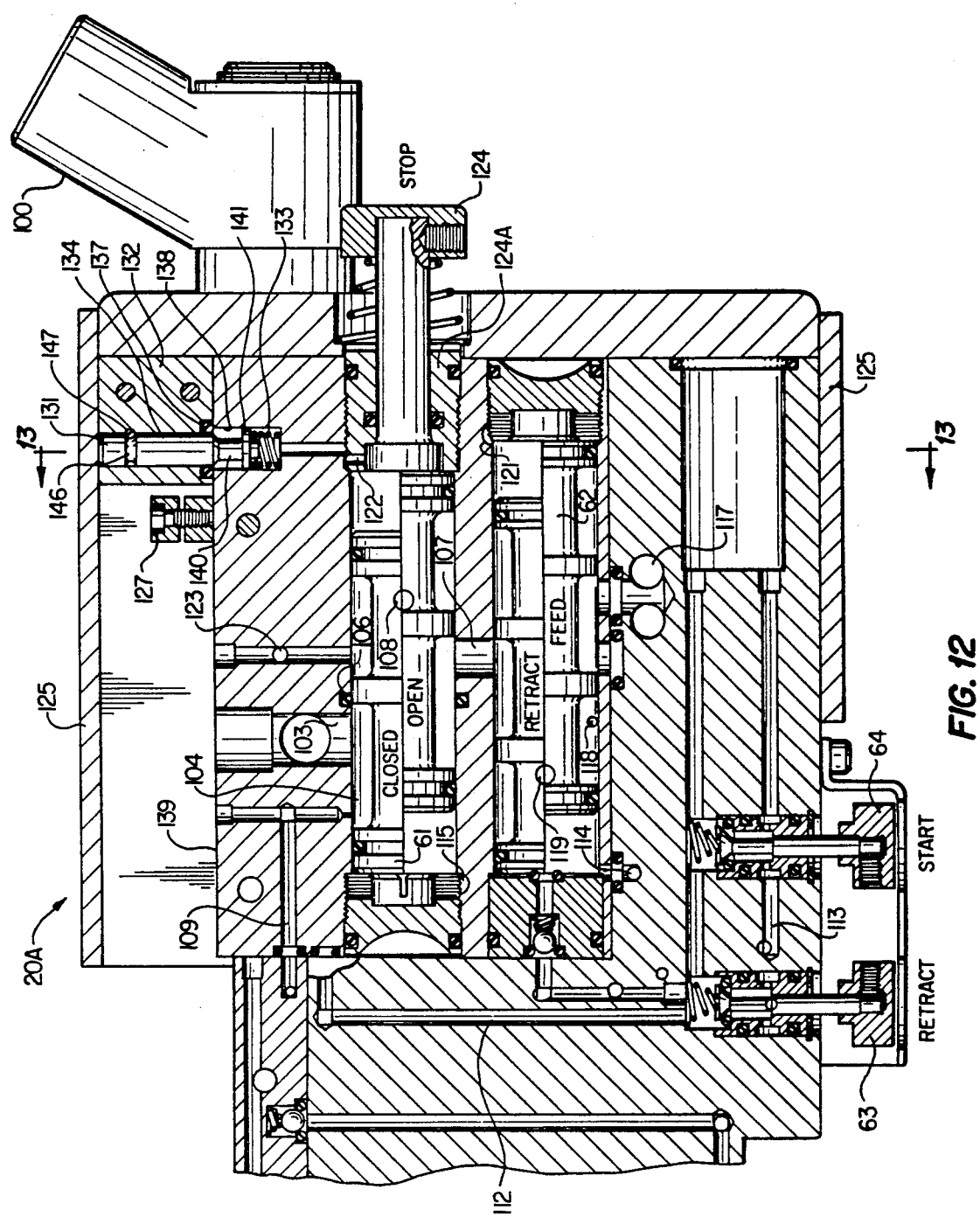
FIG. 12 is a fragmentary view in section of another embodiment of a peck drill in accordance with the invention as seen along a line corresponding with the line 12—12 in FIG. 1.
Figure 13:
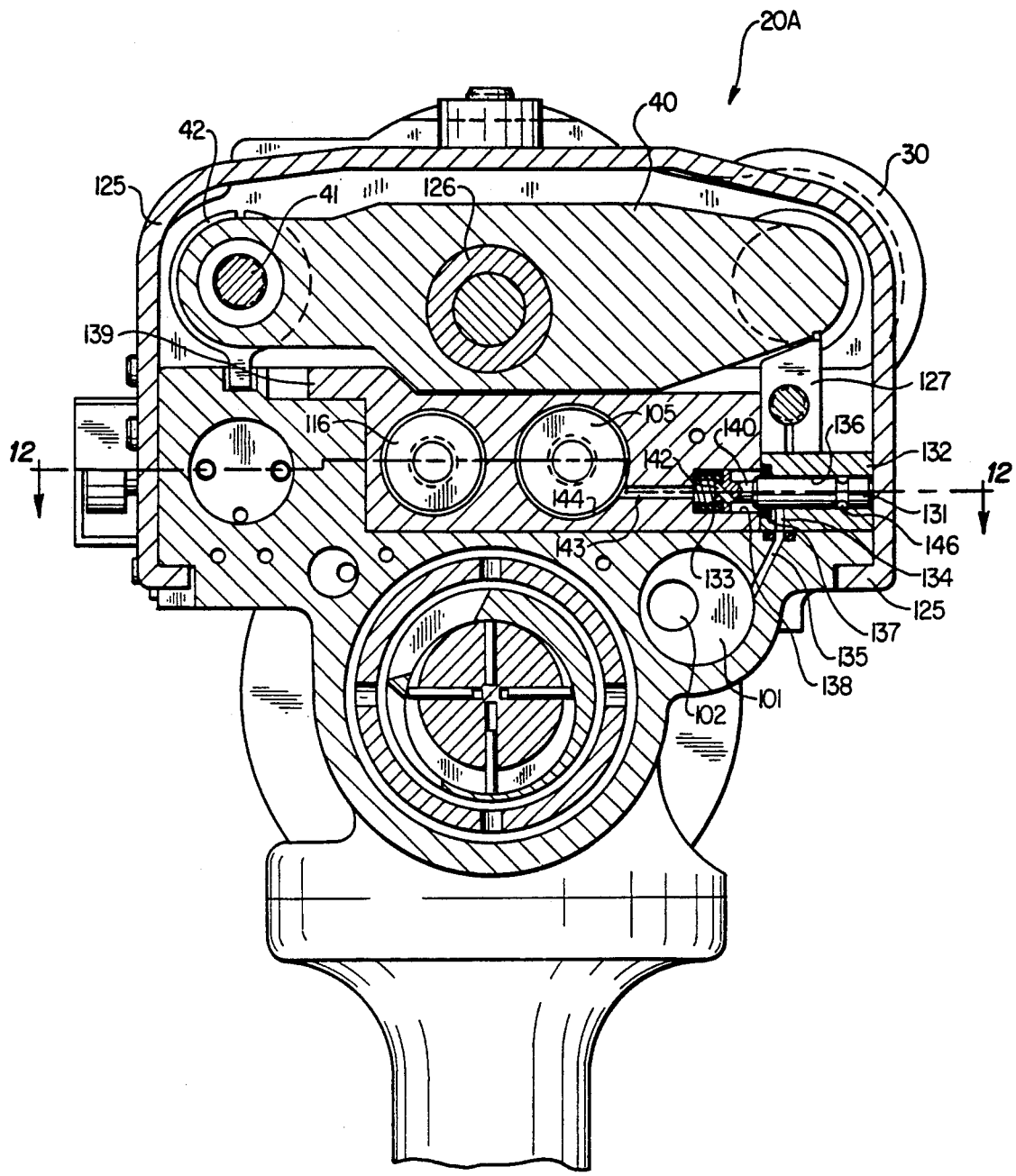
FIG. 13 is a fragmentary view in section and elevation of the embodiment of the peck drill illustrated in FIG. 12 as seen along the line 13—13 of FIG. 12.

The peck drill 20A is powered by supply air which enters the tool through the fittings 25 and 100 flowing into a cavity 101, see FIG. 13. The air flows from the cavity 101 through a hole 102 which communicates with a hole 103, FIG. 12, opening into a cavity 104 containing the master valve 61. In FIG. 12 the master valve and retract valve are schematically illustrated both open and closed. When the master valve is closed, a seal 106 around the master valve in the cavity 104 contains the supply air and a supply line 107 is open to an exhaust port 108. A line 109 supplies air to release the hydraulic feed control brake 31. The retract control valve 63 and the start control valve 64 receive supply air from the line 103 through a line 112. When the start control valve 64 is depressed, air is admitted into a line 113 which communicates internally with ports 114 and 115 to shift the master valve 61 to the open position and the selector valve 62 to the feed position. When in the feed position the selector valve directs supply air from the supply line 107 to the motor line O connected into the motor 21 as shown in FIG. 5. At this position of the retract valve a retract line 118 is open to an exhaust port 119. When the selector valve is in the retract mode, supply air is directed from the supply line to the retract line during the retract phase and exhaust air from the thrust and retract piston is forced through the motor to keep it running while the bit is withdrawn from the hole. Depression of the retract control valve 63 will pneumatically open the retract valve. If the retract valve is opened in any manner, the selector valve 62 will be moved to retract position by air admitted through a port 121 and the master valve 61 is closed by air admitted through a port 122. Depressing the stop button 124 manually shifts the master valve to the left as viewed in FIG. 12 to a closed position.

Referring to FIGS. 12 and 13, a shroud 125 encases reciprocating structure of the drill including the rods 34, 41, and 44, and related structure which can present a hazard to a drill operator in the absence of the shroud. The thrust arm 40 mounted on and driven by the rod 34 engages the rods 41 and 44. In accordance with the invention a power interrupt valve 131 is mounted in an interrupt block 132 on the side of the peck drill body opposite the retract and start valves 63 and 64. The interrupt valve is a cylindrical member having a flow recess 140, a stop flange 141, and a locking recess 146. As shown in FIGS. 12 and 13, the shroud 125 holds the interrupt valve in a depressed closed position. Lines 134 and 135 in the power interrupt block connect the cavity 101 with a bore 136 in which the interrupt valve 131 is mounted for controlling emergency shut-down of the peck drill. A seal 137 in the interrupt block 132 around the bore 136 forms an air tight seal with the interrupt valve. The connection of the line 134 into the bore 136 is upstream of the seal 137 so that supply air from the cavity 101 entering through the lines 135 and 134 is blocked off by the interrupt valve 131 at the seal 137. A bore 138 in a valve block 139 is coaxial with and opens into the bore 136. The interrupt valve is engaged by a spring 133 in the bore 138 biasing the interrupt valve outwardly, or up as viewed in FIG. 12. A hole 143 in the valve block 139 extends from the interrupt valve bore 138 into the master valve bore 145 behind the master valve around a stop valve sleeve 124a to admit air from the bore 143 into the master valve bore 145 to shift the master valve to the closed position.

Figure 14:
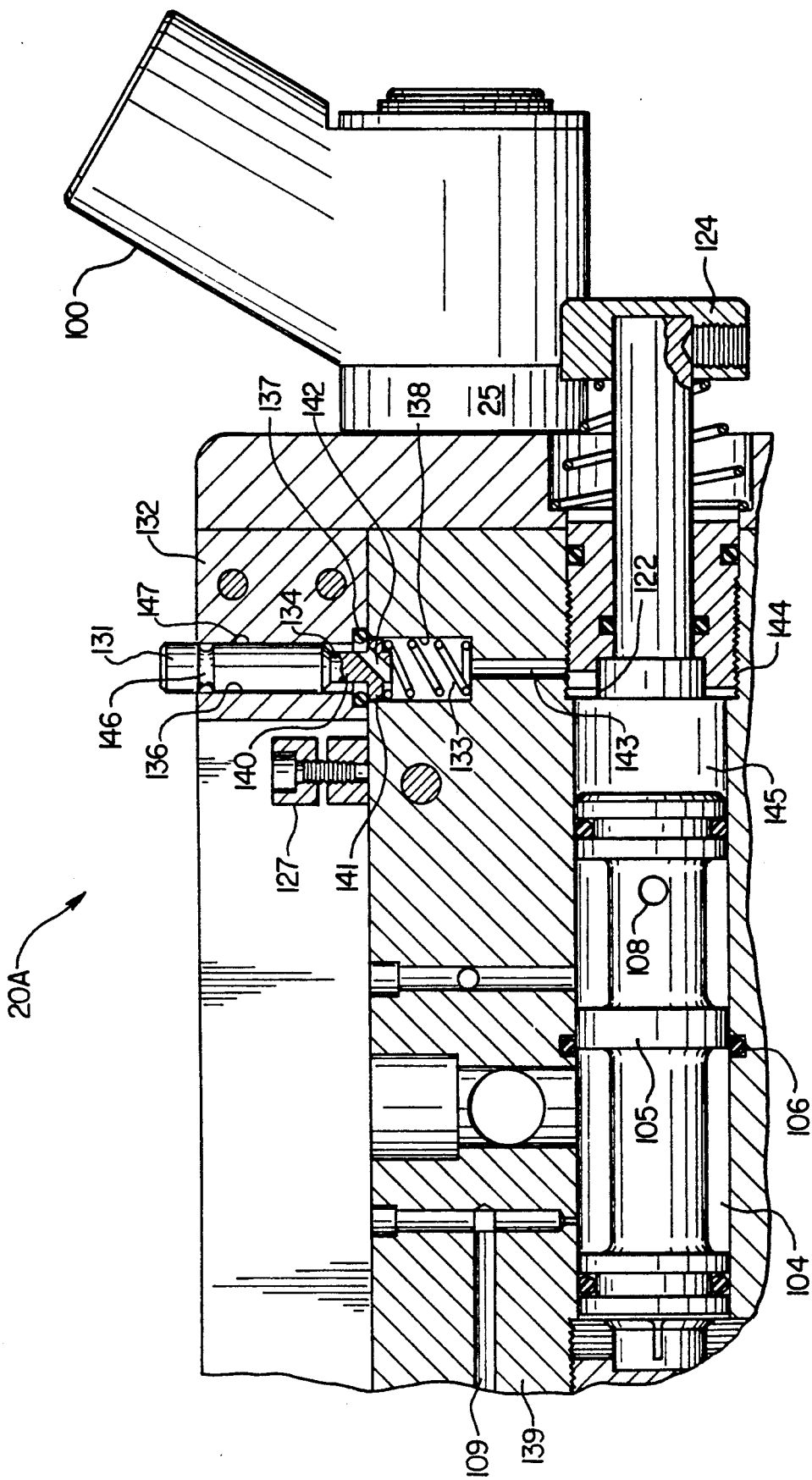
FIG. 14 is an enlarged fragmentary view in section and elevation illustrating the safety system of the invention activated disabling the peck drill.
Figure 15:
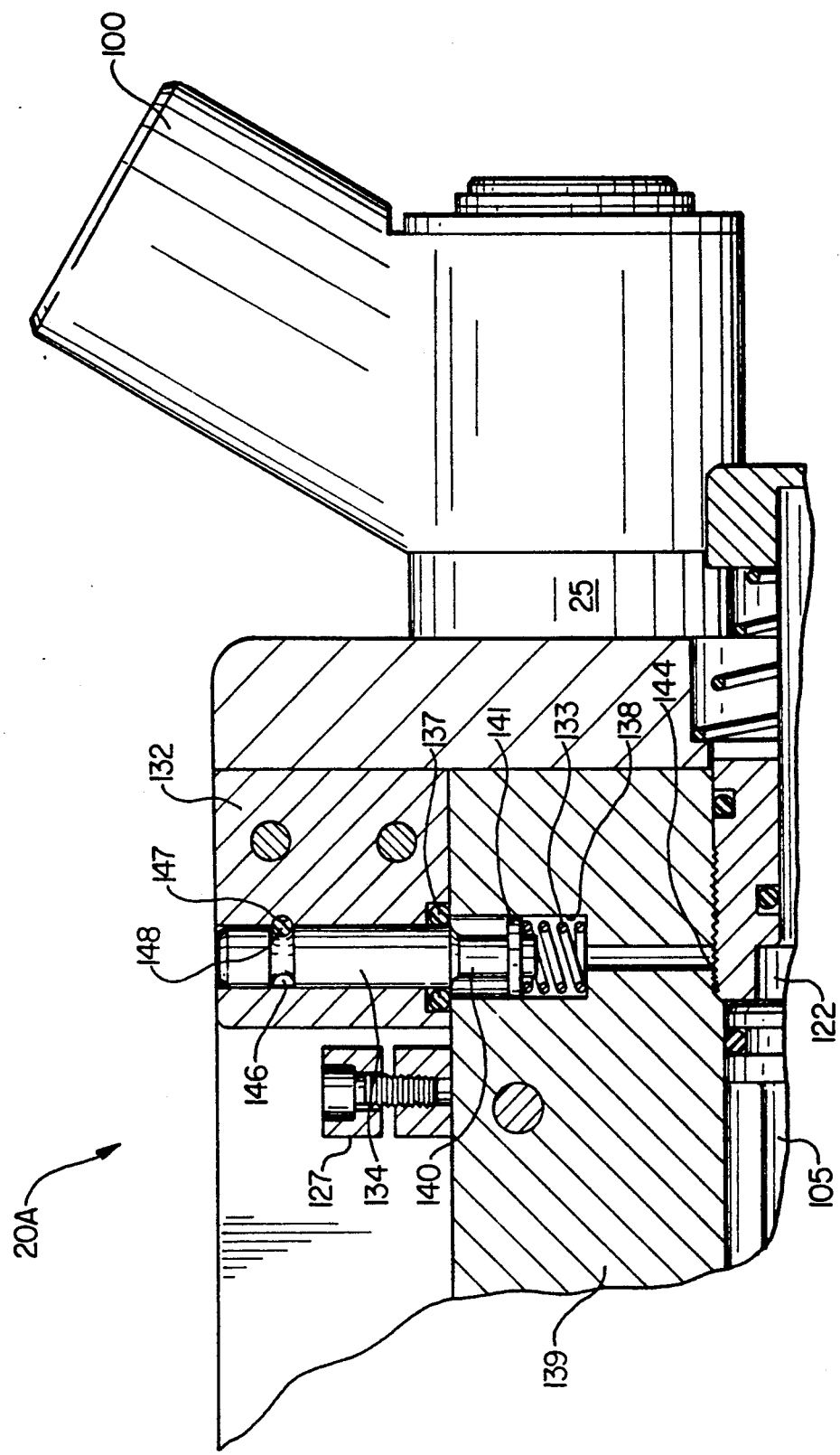
FIG. 15 is a fragmentary view in section and elevation similar to FIG. 14 showing the safety system rendered inoperative for operating the drill without a safety shroud.

The interrupt valve 131 is operative to disable the peck drill 20A when the shroud 125 is removed, either intentionally or accidentally. The shroud holds the interrupt valve closed against the compressed spring 133 in the position illustrated in FIGS. 12 and 13. In this closed position, the supply air from the cavity 101 through lines 134 and 135 into the bore 136 is confined to the bore 136 by the seal 137 around the interrupt valve engaging the outer surface of the valve. Thus, the interrupt valve prevents the supply air from entering the master valve bore 145. When the shroud is removed from the drill body, accidentally or intentionally, the compressed spring 133 expands extending the interrupt valve 131 outwardly to the open position illustrated in FIG. 14 at which the stop flange 141 engages the seal 137. The interrupt valve recess 140 spans the seal permitting supply air to flow from the cavity 101 through the lines 134 and 135 into the bore 136, around the seal 137 into the bore 138, through the bore 143 into the undercut 144, and then into the master valve bore 145 behind the master valve. The air in the bore 145 forces the master valve to the left, as seen in FIG. 14, to the closed position illustrated thereby disabling the peck drill. The master valve bore will remain under pressure as long as the inlet fitting is supplied with air and the shroud is not in place. Depressing the start valve will not reopen the master valve.

The shroud 125 is preferably fabricated of a transparent plastic to provide maximum protection to the drill operator and maximum visibility of the drill operating structure and adjustment features to permit control of the drill rapid advance and depth without removal of the shroud. The top of the shroud may be marked with incremental markings for reference of the adjustment settings. Adjustment for rapid advance and depth can be performed externally with hexagon keys from the rear of the drill.

Provision is made for locking the interrupt valve 134 out of service so that the peck drill may be operated without the shroud for maintenance and adjustment purposes, if necessary. The interrupt valve 131 is held at the inward position of FIGS. 12, 13, and 15 while a pin 148 is installed through a hole 147 in the power interrupt block 132 passing through the groove 146 in the interrupt valve body so that the pin holds the interrupt valve at the inward locked-out closed position. So long as the pin remains in place the tool can be operated without the shroud as the interrupt valve cannot move outwardly to the open disabling position of FIG. 14.

What is claimed is:

1. A pneumatic peck drill operable in repetitive cycles including a rapid advance phase to a set back distance from a workpiece, a drilling phase, and a retract phase, comprising:
   (a) a drill motor for rotating, advancing, and retracting a drill bit chuck through said cycles;
   (b) pneumatic power means for advancing and retracting said drill motor;
   (c) drilling phase control means connected with said drill motor and said pneumatic power means for limiting the drilling phase of said motor to a predetermined drill depth;
   (d) retract phase control means operable with said drill motor and power means for controlling the retract phase of each peck cycle;
   (e) peck cycle control means connected with said pneumatic means for terminating each drilling phase and controlling the rate of said repetitive peck cycles;
   (f) hydraulic feed control means including a damping cylinder having a piston rod operable with said drill motor and power means to limit the advance of said drill motor in said drilling phase to an adjustable predetermined rate;
   (g) set back control means operable with said feed control means for limiting said feed control means during said retract phase to a predetermined set back distance whereby said drilling phase during each peck cycle begins at a predetermined position before a bit carried by said chuck engages a workpiece;
   (h) a shroud around selected movable components of said drill to protect an operator from injury; and
   (i) means engageable by said shroud and connected with said pneumatic power means for disabling said pneumatic power means in response to removal of said shroud.

2. A pneumatic peck drill in accordance with claim 1 wherein said set back control means comprises a brake engageable with said feed control piston rod for movement with said piston rod in both the drilling phase and retract phase directions when said brake is unrestrained and said brake permitting movement of said feed control rod in said drilling phase direction and limiting movement of said feed control rod in said retract phase direction when said brake is restrained.

3. A pneumatic peck drill in accordance with claim 2 including an adjustable feed back nut associated with said feed control piston rod for limiting movement of said brake and said rod to said set back distance during said retract phase.

4. A pneumatic peck drill in accordance with claim 3 wherein said peck cycle control means comprises a pneumatic system including a volume storage chamber, an adjustable valve for charging said chamber, and a pilot valve for terminating said drilling phase at a predetermined fluid pressure in said volume chamber.

5. A pneumatic peck drill in accordance with claim 4 wherein said peck cycle control means includes a feed control pad having an exhaust port mounted on said feed control piston rod and exhaust port closure means coupled with said drill motor for closing said exhaust port during said drilling phase and opening said exhaust port during said retract phase.

6. A pneumatic peck drill in accordance with claim 5 including a thrust arm connected with said drill motor having a face engageable with said feed control pad to initiate said drilling phase and said thrust arm having another surface engageable with said drilling phase control means for limiting the advance of said drill motor for controlling the drilling depth of said drill.

7. A pneumatic peck drill in accordance with claim 6 including means connected with said drill motor for engaging said retract phase control means for limiting said retract phase.

8. A pneumatic peck drill in accordance with claim 7 including a thrust and retract piston assembly, means connecting said assembly with said thrust arm, and means connecting said assembly with said drill motor.

9. A pneumatic peck drill in accordance with claim 8 wherein said thrust and retract piston assembly has a piston rod extending from opposite ends of said assembly; said piston rod being connected at one end to said thrust arm, and a yoke connected between said drill motor and an opposite end of said piston rod.

10. A pneumatic peck drill in accordance with claim 7 wherein fluid in the power end of said drill motor behind said drill motor and feed assembly exhausts through said drill motor during said retract phase for turning said motor while withdrawing a drill bit from a workpiece.

11. A pneumatic peck drill in accordance with claim 9 wherein said thrust and retract piston assembly and said drill motor and feed cylinder exhausts through said drill motor to turn said motor while withdrawing a drill bit from a workpiece.

12. A pneumatic peck drill in accordance with claim 7 wherein said drilling phase control means includes a mechanically operable pneumatic valve.

13. A pneumatic peck drill in accordance with claim 12 wherein said retract phase control means includes a mechanically operable pneumatic valve.

14. A pneumatic peck drill in accordance with claim 13 wherein said brake is pneumatically released from said feed control piston rod when said drill has drilled to a predetermined depth to shift said drill to a stand by mode.

15. A pneumatic peck drill in accordance with claim 14 including a rapid advance stop plate adjustably mounted to limit the movement of said feed control pad and said feed control piston rod away from said hydraulic feed control means.

16. A pneumatic peck drill in accordance with claim 15 including a start valve connected with said drill for controlling an air supply to start said drill, a retract valve connected with said drill to initiate said retract phase and place said drill in a stand by mode, and a stop valve connected with said drill to stop said drill in the operation phase of said drill in effect when said stop valve is activated.

17. A pneumatic peck drill in accordance with claim 16 including a master valve and a selector valve connected with said drill for controlling the supply of air to said drill during said rapid advance, drilling, and retract phases of said peck cycles, said master valve being pneumatically coupled with said means for disabling said pneumatic power means whereby said master valve is closed by removal of said shroud.

18. A pneumatic peck drill operable in repetitive peck cycles including a rapid advance phase, a drilling phase, and a retract phase comprising:
(a) a drill motor and feed cylinder assembly including an air operated drill motor mounted in a cylinder for turning a drill bit chuck attached to said motor and advancing and retracting said chuck during said peck drilling cycles;
(b) a yoke secured with said drill motor moving with said motor during said rapid advance phase said drilling phase, and said retract phase;
(c) a thrust arm connected with said yoke for movement with said yoke during each operation phase of each peck cycle;
(d) a hydraulic feed control unit mounted for operation with said thrust arm including a feed control piston rod spring biased to extend away from said unit in a retract phase direction and damping means for controlling the movement of said feed control rod into said unit at a reduced desired rate;
(e) a brake mounted on said feed control unit piston rod, said brake being adapted to travel with said piston rod when movement of said brake is unrestrained, to permit free movement of said piston rod in a drilling direction into said feed control unit, and to tightly grip said piston rod preventing movement of said piston rod through said brake in a retract direction away from said feed control unit;
(f) a stationary bulkhead around said feed control unit piston rod between said brake and said feed control unit;
(g) an adjustable set back nut secured around and independent of said control unit piston rod on the opposite side of said brake from said bulkhead for limiting the movement of said brake away from said bulkhead, said nut being adjustable to positions along said rod to permit spacing between said brake and said bulkhead equal to a desired set back distance;
(h) a feed control piston rod bearing member around said rod on the other side of said set back nut from said brake to support said piston rod and permit said rod to move toward and away from said feed control unit;
(i) a feed control pad on the outward end of said feed control unit piston rod, said pad having a flow passage and an exhaust port engageable by a face on said thrust arm to close said exhaust port and to urge said feed control unit piston rod into said feed control unit during said drilling phase of said peck cycle;
(j) a rapid advance stop ring secured with said drill for engagement by said feed control pad to limit the movement of said feed control unit piston rod and feed control pad away from said feed control unit;
(k) an adjustable drilling depth limit ring movably secured on said drill for engagement and movement by said thrust arm to limit operation of said drill to a desired drilling depth;
(l) a pneumatic drilling depth limit valve secured on said drill and operable by said depth limit ring when said drill has drilled to a desired depth;
(m) a pneumatic retract limit valve secured on said drill operable by said yoke to limit the retract phase of said peck cycle;
(n) a pneumatic peck cycle rate control volume chamber and an adjustable flow control valve connected with said volume chamber for controlling the cycle rate of said drill responsive to a predetermined air pressure in said volume chamber, said volume chamber being connected with said feed control pad on said feed control unit piston rod whereby air pressure is retained in said volume chamber when said thrust arm engages said feed control pad and during said drilling phase of said peck cycle and said volume chamber is exhausted when said drilling phase ends and said retract phase begins as said thrust arm moves away from said feed control pad during said retract phase;
(o) a pneumatic master valve;
(p) a pneumatic selector valve;
(r) an air line from said master valve to said brake to release said brake when said drill is in a stand by mode;
(s) air supply line means from said master valve through said selector valve into said drill motor and feed cylinder to supply air pressure for advancing said drill motor during said rapid advance and drilling phases of said peck cycles;
(t) air lines means from said selector valve to said drill motor and feed cylinder for operating said drill motor through said retract phase;
(u) a pneumatic start valve between said air supply line and said selector valve and said master valve;
(v) a pneumatic retract valve to cause said drill to retract;
(w) a manual stop control connected with said master valve to stop operation of said drill;
(x) a safety shroud around selected operating parts of said drill;
(y) a pneumatic stop control connected with said master valve to pneumatically close said valve to disable said drill in response to removal of said protective safety shroud; and
(z) air lines and valve means interconnecting said master and selector valves and said depth control and retract valves and said volume chamber operable to direct air flow to effect operation of said drill through said rapid advance, drilling, retract, and stand by phases of operation.

19. A pneumatic peck drill in accordance with claim 18 including a thrust and retract piston assembly coupled with said drill motor and said thrust arm and connected with air lines to said selector valve, said volume chamber, and said drill motor and feed cylinder operable during said rapid advance, drilling, and retract phases of said peck cycles.

20. A pneumatic peck drill in accordance with claim 1 wherein said means for disabling said pneumatic means comprises:
   (a) a pneumatically operable master valve connected with said power pneumatic means for air flow control to said pneumatic power means;
   (b) an air supply line to said master valve to provide air to close said master valve; and
   (c) an interrupt valve in said air supply line, said interrupt valve being held closed by said shroud and being opened in response to removal said shroud to supply air to said master valve to close said master valve.

21. A peck drill in accordance with claim 20 including a spring engaged with said interrupt valve biasing said interrupt valve toward an open position for opening said interrupt valve upon removal of said shroud.

22. A peck drill in accordance with claim 21 where said interrupt valve is a cylindrical member and said spring engages an inward end of said member and an outward end of said member is engageable by said shroud.

23. A peck drill in accordance with claim 22 including means for locking said interrupt valve closed with said shroud removed for operating said drill during set-up and maintenance in the absence of said shroud.

24. A peck drill in accordance with claim 23 where said means for locking said interrupt valve closed comprises: a locking recess along a side of said cylindrical valve member and a locking pin engageable in said looking recess.

25. A peck drill in accordance with claim 19 wherein said pneumatic stop control comprises:
   (a) an air supply line to said master valve to provide air to close said master valve; and
   (b) an interrupt valve in said air supply line, said interrupt valve being held closed by said shroud and being opened in response to removal of said shroud to supply air to said master valve to close said master valve.

26. A peck drill in accordance with claim 25 including a spring engaged with said interrupt valve biasing said interrupt valve to an open position for opening said interrupt valve when said shroud is removed.

27. A peck drill in accordance with claim 26 where said interrupt valve is a cylindrical member engaged at one end with said spring and engageable at the opposite end by said shroud for holding said interrupt valve closed.

28. A peck drill in accordance with claim 27 including means for locking said interrupt valve closed when said shroud is removed.

29. A peck drill in accordance with claim 28 wherein said means for locking said interrupt valve closed comprises: a locking recess along one side of said valve member and a locking pin engageable with said recess to lock said interrupt valve closed.

30. In a pneumatic peck drill having a drill motor and feed cylinder assembly, a yoke secured with the drill motor for advancing and retracing said drill motor, a thrust arm connected with a yoke, a hydraulic feed control unit mounted for operation with the thrust arm for controlling movement of the thrust arm, and apparatus for controlling a rapid advance phase, drilling phase, and a retract phase of said peck drill including a pneumatic master valve, and a safety shroud covering exposed movable parts of said peck drill, the improvement comprising a safety system to disable said peck drill when said shroud is removed including an interrupt valve in an air supply line to said master valve, said interrupt valve being engageable by said shroud to hold said interrupt closed when said shroud is in operating position on said peck drill, and means biasing said interrupt valve toward an open position for opening said interrupt valve upon removal of said shroud from said peck drill.

31. A peck drill in accordance with claim 30 including a spring engaged with said interrupt valve biasing said interrupt valve toward an open position for opening said interrupt valve upon removal of said shroud.

32. A peck drill in accordance with claim 31 where said interrupt valve is a cylindrical member and said spring engages an inward end of said member and an outward end of said member is engageable by said shroud.

33. A peck drill in accordance with claim 32 including means for locking said interrupt valve closed with said shroud removed for operating said drill in the absence of said shroud.

34. A peck drill in accordance with claim 33 where said means for locking said interrupt valve closed comprises: a locking recess along a side of said cylindrical valve member and a locking pin engageable in said locking recess.

35. A pneumatic peck drill in accordance with claim 1 wherein said shroud is fabricated of transparent plastic.

36. A pneumatic peck drill in accordance with claim 35 wherein said shroud has incremental markings for reference of adjustment settings.

37. A pneumatic peck drill in accordance with claim 18 wherein said shroud is fabricated of transparent plastic.

38. A pneumatic peck drill in accordance with claim 37 wherein said shroud has incremental markings for reference of adjustment settings.

39. A pneumatic peck drill in accordance with claim 29 wherein said shroud is fabricated of transparent plastic.

40. A pneumatic peck drill in accordance with claim 39 wherein said shroud has incremental markings for reference of adjustment settings.

41. A pneumatic peck drill in accordance with claim 30 wherein said shroud is fabricated of transparent plastic.

42. A pneumatic peck drill in accordance with claim 41 wherein said shroud has incremental markings for reference of adjustment settings.

* * * * *

UNITED STATES PATENT AND TRADEMARK OFFICE
CERTIFICATE OF CORRECTION

PATENT NO.    : 5,295,770
DATED         : March 22, 1994
INVENTOR(S)   : Robert A. Pennison and Richard E. Eckman It is certified that error appears in the above-identified patent and that said Letters Patent is hereby corrected as shown below:

Column 10, Line 45: After "master valve"; insert -- through an undercut 144 formed in the valve block 139 --

Signed and Sealed this

Sixth Day of September, 1994

Attest:

BRUCE LEHMAN

Attesting Officer        Commissioner of Patents and Trademarks